United States Patent [19]
Platusich et al.

[11] Patent Number: 5,236,006
[45] Date of Patent: Aug. 17, 1993

[54] INSULATED HVAC VALVE ASSEMBLY

[76] Inventors: Bruce M. Platusich, 21444 Meadowview Ct., Bristol, Ind. 46507; Don A. Leonhard, 7710 Bay Ridge Dr., Indianapolis, Ind. 46236

[21] Appl. No.: 872,071

[22] Filed: Apr. 22, 1992

[51] Int. Cl.$^5$ .......................... F16L 7/00; F16K 51/00
[52] U.S. Cl. .................................. 137/375; 137/559; 251/288; 251/292; 251/285
[58] Field of Search ............... 251/285, 286, 288, 292; 137/375, 559

[56] References Cited

U.S. PATENT DOCUMENTS

| | | | |
|---|---|---|---|
| 1,909,494 | 5/1933 | Leins | 16/117 |
| 1,990,197 | 2/1935 | Mohr | 251/292 |
| 2,935,293 | 5/1960 | Monson | 251/288 |
| 3,061,267 | 10/1962 | Hamer | 251/288 |
| 4,257,575 | 3/1981 | Runyan | 251/292 |
| 4,571,111 | 2/1986 | Keogh | 16/118 |
| 4,593,430 | 6/1986 | Spangler | 16/121 |
| 4,723,569 | 2/1988 | Ellis | 251/292 |
| 4,766,642 | 8/1988 | Gaffney | 16/121 |
| 4,783,885 | 11/1988 | Bory | 16/114 |
| 4,920,823 | 5/1990 | Mohr | 74/553 |
| 4,967,445 | 11/1990 | Miller | 16/121 |

*Primary Examiner*—Michael Chambers
*Attorney, Agent, or Firm*—Price, Heneveld, Cooper, DeWitt & Litton

[57] ABSTRACT

A valve extension actuator subassembly for rotating an extending valve stem of an HVAC valve, having a rotational, polymeric, cylindrical, hollow projection body extending on a central axis coaxial with the valve stem, having an inner end and an outer end, and defining a central space therein, a transverse polymeric handle on the outer end of the projection body, a metal valve plate at said inner end of the projection body, rotatable therewith, and receiving the extended valve stem to rotate it, a removable thermal insulative plug in the central space for thermally insulating the subassembly, and a removable cap closing the outer end of the body. Connection of the body to the valve plate preferably includes snap-on detents. The body preferably has drive lugs interfitting with the valve plate. One embodiment has an adjustable memory stop plate serving as the valve plate, the stop mechanism being accessible with a tool extended through the central space of the body after removing the insert and cap. Another embodiment has interfitting spline teeth on the plug and the body, plus a stop lug on the inner end of the plug, to enable memory stop adjustment by removal and angular rotation of the plug, followed by reinsertion into engagement with the body.

21 Claims, 4 Drawing Sheets

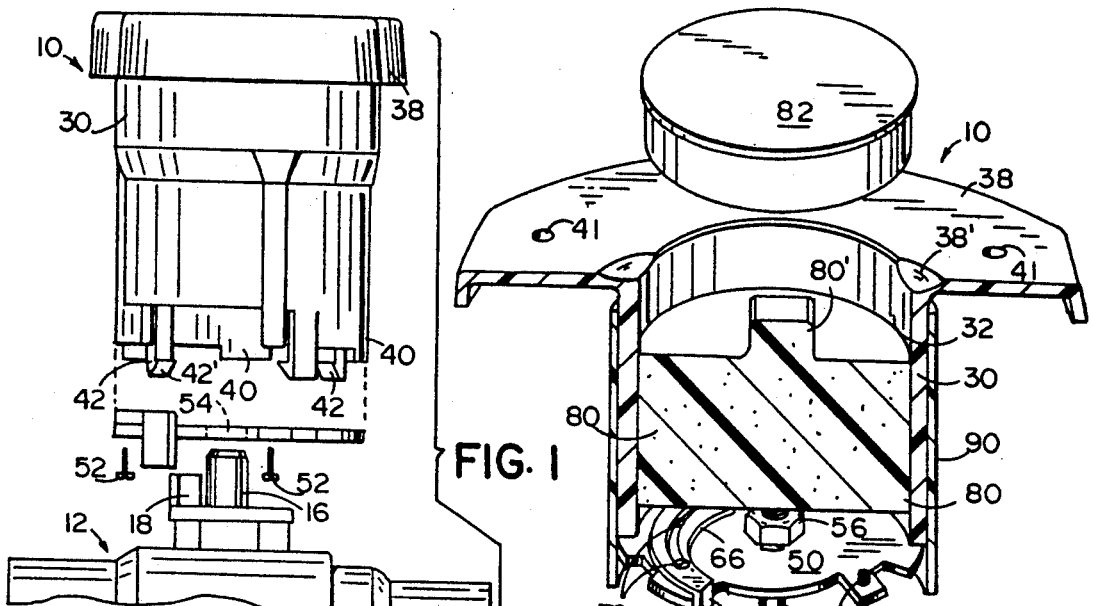
FIG. 1
FIG. 4
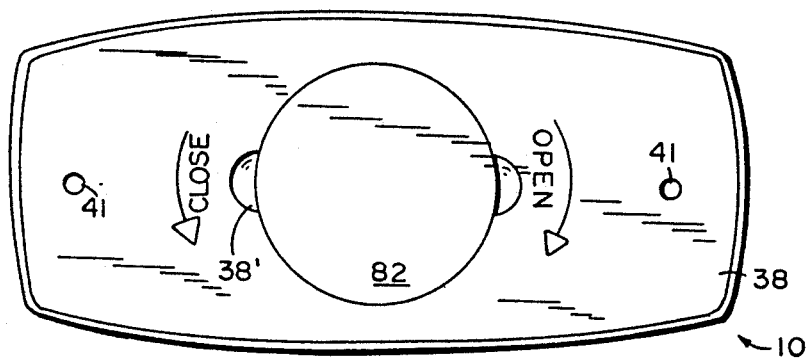
FIG. 2
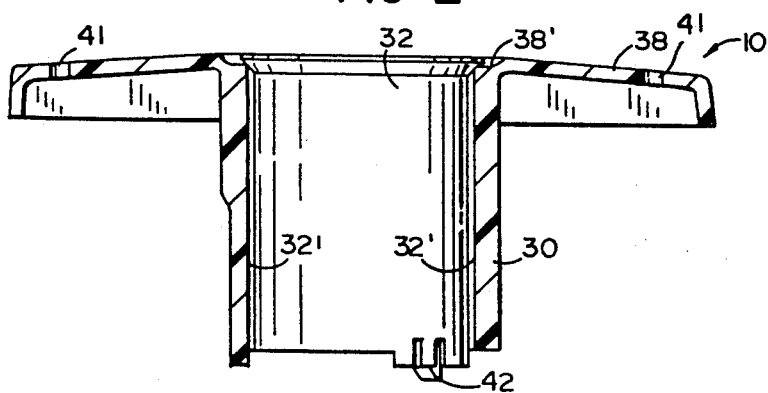
FIG. 5

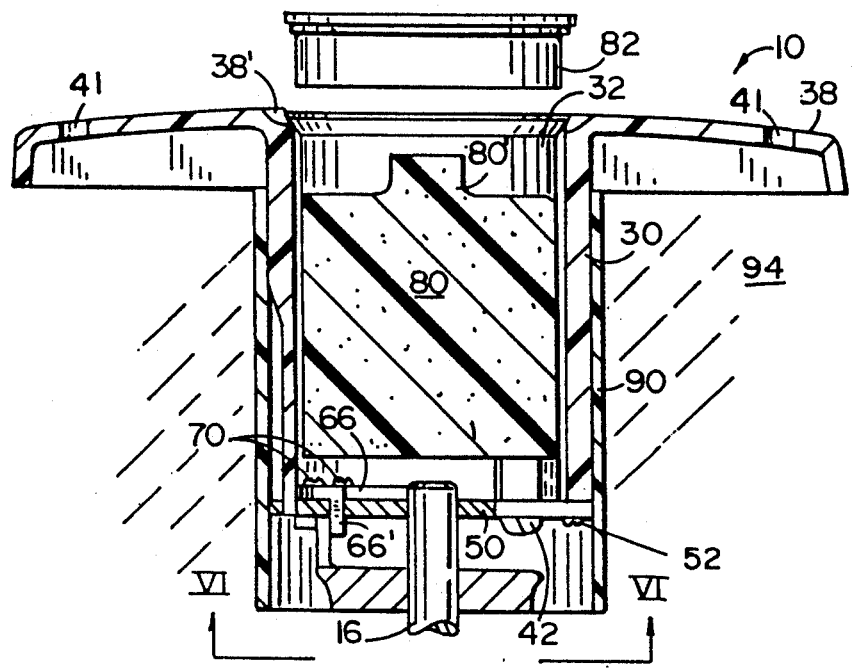
FIG. 3
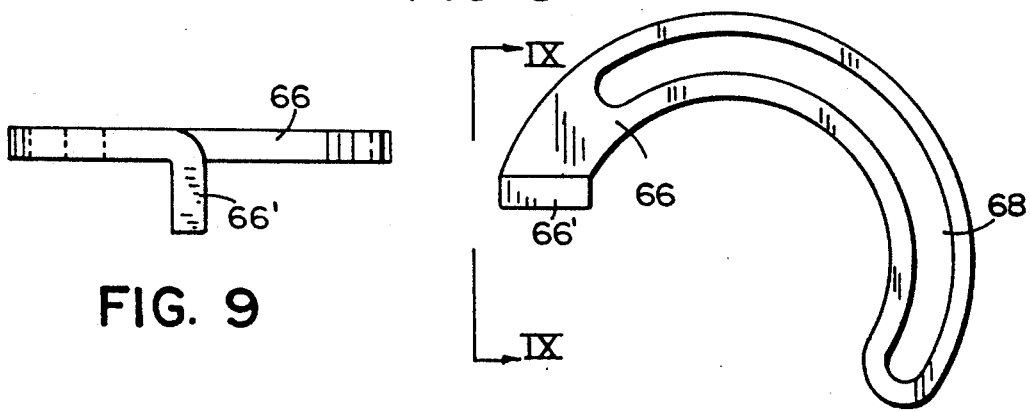
FIG. 9
FIG. 8
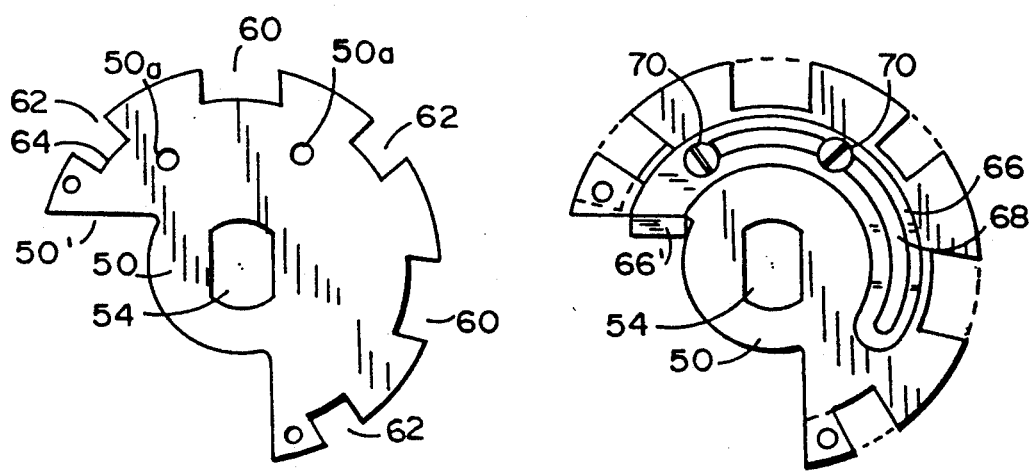
FIG. 10
FIG. 7

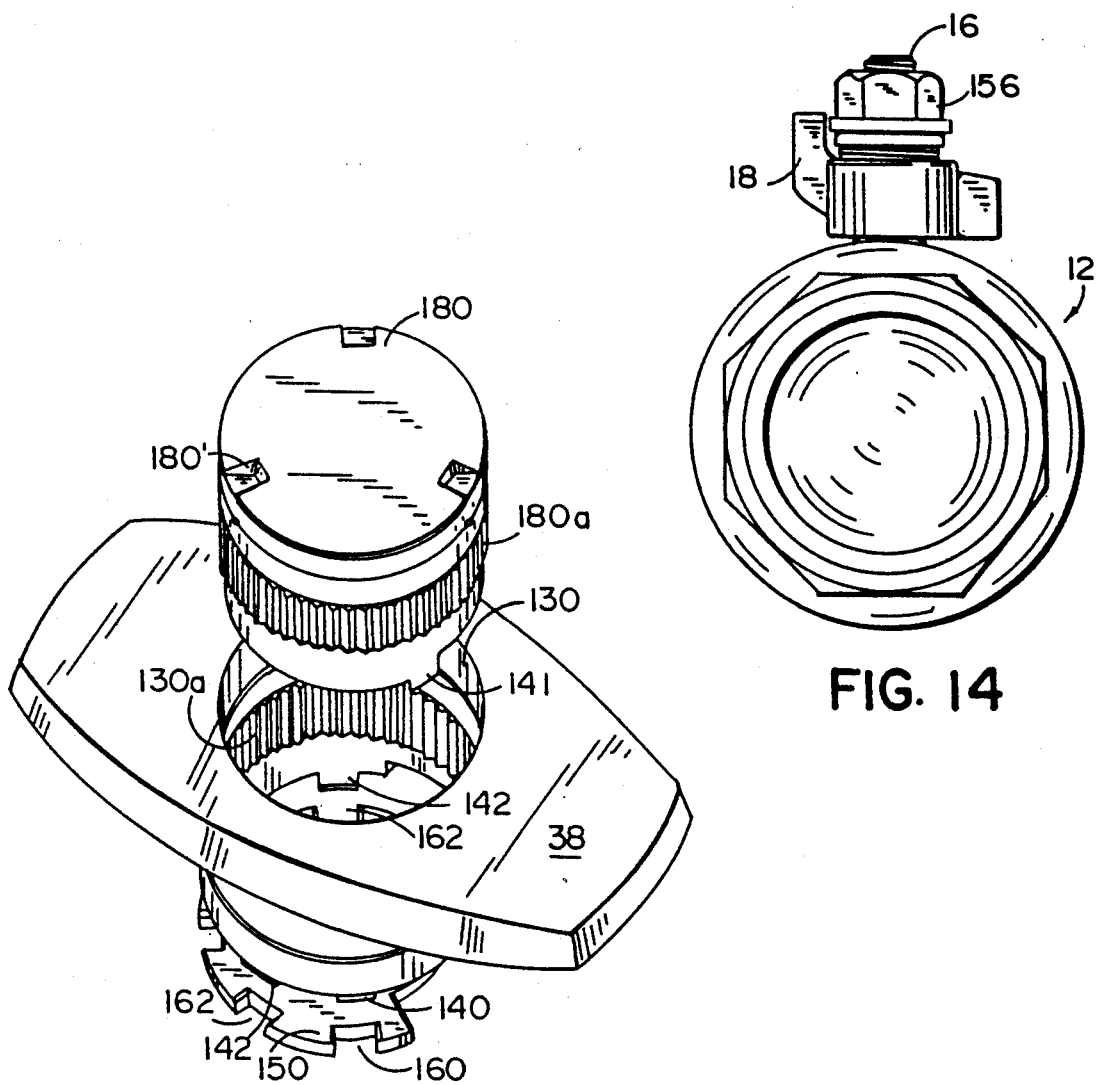

5,236,006

INSULATED HVAC VALVE ASSEMBLY

BACKGROUND OF THE INVENTION

This invention relates to thermally insulated valve actuator subassemblies and to combination HVAC valves and insulated valve actuators.

Conduit and valves used in HVAC systems frequently are thermally insulated with a wrapping material to minimize energy loss as well as inhibit condensation and corrosion. This condensation and corrosion tends to occur with refrigeration/air conditioning systems, such as those employing chilled water. Extension valve actuators to control the valves beneath the insulation extend through the thickness of the insulation to the exterior thereof where a handle is attached. On known systems, the extended actuator comprises an actuator shaft extending from the valve to the exterior handle. The shaft is of metal for torsional strength, and the handle itself is also typically of metal. Metal is normally considered necessary to provide the torsional strength needed to operate the valve. These HVAC valves typically have a so-called "memory stop," i.e., an adjustable metallic stop on the actuator which is cooperative with a fixed stop on the valve body, to control the degree of valve opening to a predetermined amount. Access to this memory stop for adjustment thereof is with a tool, typically a screwdriver, that is inserted through the insulation alongside the valve stem. Even though insulation is wrapped around the pipes and valves, the high thermal conductivity of the metal extension components, and of the memory stop components, results in cold temperatures at the exterior of the insulation, with resulting energy loss, condensation and corrosion.

SUMMARY OF THE INVENTION

An object of this invention is to provide a unique valve actuator subassembly for HVAC valves, inhibiting thermal conductivity from the metal valve to the exterior of the insulation, and therefore inhibiting condensation and corrosion characteristic of prior units. The invention employs polymeric components of a special shape and arrangement, resulting in excellent torsional strength with a high insulation factor. The polymeric extension actuator is hollow and of substantial cylindrical diameter above the valve. The common prior art metal actuator shaft from the valve to the exterior of the insulation is neither needed nor employed.

Still, an adjustable memory stop can be used which is fully and readily accessible. In one embodiment, the memory stop can be set with a conventional tool, typically a screwdriver. In a second embodiment, the memory stop can be set manually, using parts of the specially configured actuator. The novel structure is readily attachable to the valve plate that rotates the valve stem, even though the valve plate is beneath the thickness of insulation.

Another object of this invention is to provide a novel combination valve and condensation and corrosion inhibiting actuator subassembly.

The actuator subassembly of this invention has an integral, polymeric, exterior actuator including a hollow, cylindrical extension body and an exterior transverse handle on one end, the outer end, of this body. The handle and the body are of polymeric material and preferably integral with each other. The material is thermally nonconductive. The inner end of the cylindrical body, i.e., the second end opposite the end having the handle, has axially extending, radially offset drive lugs that engage recesses in the valve plate to rotationally drive the plate. The inner end of the cylindrical body also preferably has axially extending, radially shiftable, resilient snap-on detents to engage and lock onto peripheral surfaces of the valve plate.

The hollow cylindrical body of one embodiment defines a central space which extends up through the transverse handle to allow access to the preferred underlying memory stop plate which is located within the central space at the inner end thereof, i.e., adjacent the valve. This central space preferably receives a removable, thermal insulation, plug insert as of a foam polymer, and is preferably closed at its outer end by a removable polymeric cap.

An object of another embodiment of this invention is to provide a unique valve actuator subassembly wherein the central polymeric insulation plug has a stop on the inner end thereof, and has peripheral, axially extending spline teeth interfitted with like spline teeth in the bore of the cylindrical, hollow actuator body. This enables momentary removal and rotation of the plug and reinsertion at a selected angular position for adjustment of the angular spacing of the stop elements for setting the maximum valve opening by the angular position of the central plug relative to the housing.

Both embodiments of this assembly result in negligible thermal conduction from the valve to the actuator handle, yet with full functional capabilities of the HVAC valve, including, if desired, an adjustable memory stop.

These and other objects, advantages and features of the invention will become apparent upon studying the following specification in conjunction with the drawings.

BRIEF DESCRIPTION OF THE DRAWINGS

FIG. 1 is an elevational exploded view of the first embodiment of the novel valve actuator subassembly, with a conventional valve;

FIG. 2 is a top plan view of the actuator subassembly in FIG. 1;

FIG. 3 is a sectional view through the novel actuator in FIG. 1, on a vertical plane;

FIG. 4 is a sectional perspective view of the first embodiment actuator, showing one part exploded;

FIG. 5 is an elevational view of the projection body of the valve actuator subassembly;

FIG. 7 is a top plan view of the memory stop plate in FIG. 6;

FIG. 8 is an enlarged plan view of the adjustable stop shoulder and body in FIG. 7;

FIG. 9 is an elevational view taken on plane IX—IX of FIG. 8;

FIG. 10 is a top plan view of just the valve plate without the adjustment mechanism;

FIG. 11 is a perspective exploded view of a second embodiment of the invention;

FIG. 14 is an end elevational view of the conventional valve in FIG. 13.

DESCRIPTION OF THE PREFERRED EMBODIMENTS

First Embodiment

Figure 6:
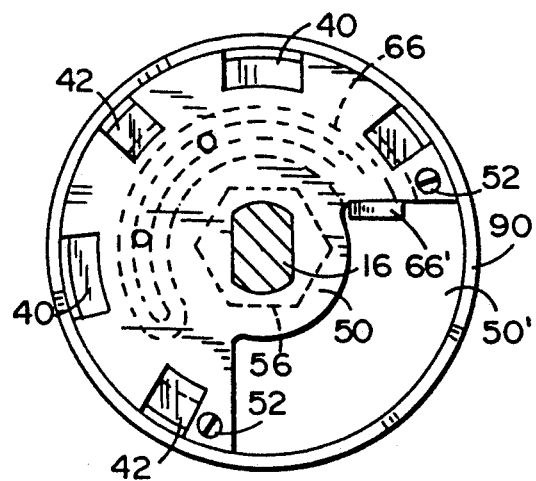
FIG. 6 is a sectional view taken on plane VI—VI of FIG. 3, showing the valve plate, here a memory stop plate.
Figure 12:
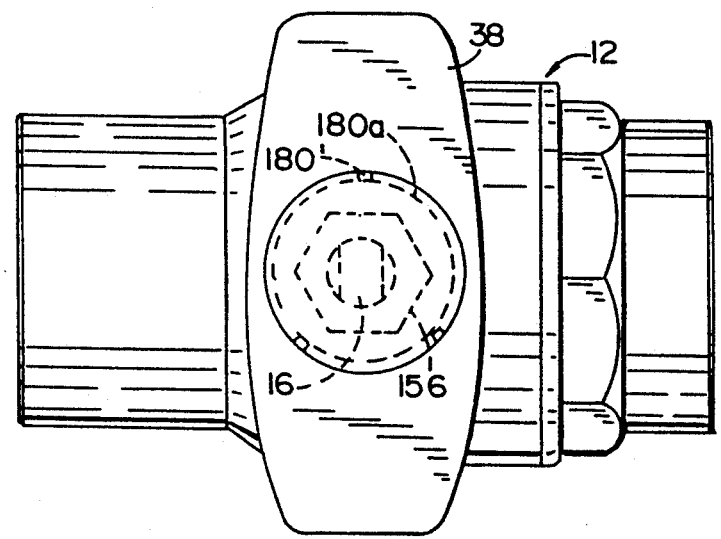
FIG. 12 is a top plan view of the second embodiment.

Referring now to the first ten figures, the valve actuator subassembly 10 is combinable with a conventional valve such as a ball valve 12 (FIG. 1) as for HVAC systems. The valve typically includes an inner valve element, e.g., of the ball type, inside valve housing 14, with a valve stem 16 extending from the valve element and through the housing for rotational movement of the valve stem and the valve. Laterally adjacent the valve stem is a fixed stop 18 typically extending integrally from valve housing 14.

The valve actuator subassembly 10 is composed of several unique interfitting components including a rotational, polymeric, cylindrical, hollow projection body 30 having a central axis and first and second ends, the first end being the outer end and the second end being the inner end. At the outer end is a handle 38 which is preferably integrally formed of polymeric material integral to the remainder of body 30, and extending transversely to the central axis of body 30. Body 30 and handle 38 are open through the center thereof to form central space 32 extending from the bottom open end of cylindrical body 30 through handle 38. At the inner second end of body 30 are radially offset drive lugs 40 which are angularly spaced from each other and extend axially from the peripheral body 30 to engage in aligned recesses 60 in a drive plate or valve plate 50. Plate 50 is preferably of metal such as stainless steel so that the high torsional forces at the center thereof to the valve stem can be readily accommodated. Part of the lower portion of body 30 may be tapered slightly inwardly to interfit smoothly with a surrounding cylindrical sleeve 90 to be described hereinafter.

Also preferably extending from the lower axial end of body 30 is a plurality, here three, of integral, polymeric, resilient snap-on detents 42 which have tapered, i.e., sloped, lower end surfaces 42' to engage the periphery of valve plate 50 when the two are axially pressed together, and be momentarily radially-outwardly deflected until the plate passes tapered surfaces 42' and engages behind the adjacent step surfaces of projections 42. Plate 50 can thus be held axially secure relative to body 30. Supplemental securing means between plate 50 and body 30 are also shown to be used, here shown to be screws 52, to add torsional strength to the connection. Plate 50 also has a central opening 54, preferably of conventional oblong configuration (FIG. 10) to receive valve stem 16 which normally has a pair of opposite flats to fit the oblong opening. The end of valve stem 16 may protrude through plate 50 sufficiently to enable a lock nut 56 to be threaded thereto (FIG. 4), or, if desired, can simply extend through to the extent shown in FIG. 3, for rotational driving connection to plate 50.

At the outer periphery of plate 50 is an open arcuate area 50' to allow the stop lug 66' to be preset anywhere in this arcuate area through which the lug projects, as well as a plurality, here two, of drive recesses 60 (FIG. 10) for receiving lugs 40, and a plurality, here three, of recesses 62 and adjacent shoulders 64 for receiving resilient snap-on detents 42.

The structure of the first embodiment has the valve plate 50 in the form of a memory stop plate. Adjustable memory stop devices for valves have been known heretofore, but not of the disclosed construction. The memory stop plate 50 has attached thereto an arcuately shaped stop body 66 having an arcuate slot 68 therein and having at one end thereof an axially projecting stop shoulder 66' which extends downwardly (FIG. 9) to engage the conventional fixed stop 18 in the form of a post projecting upwardly from valve 12. The device is preset to cause stop shoulder 66' to engage stop 18 at the desired maximum opening of the valve, i.e., when the valve has been rotated a certain arcuate extent. This stop body 66 is attached to plate 50 by a pair of screws 70 (FIG. 7) which extend through slot 68 and through a pair of threaded openings 50a (FIG. 10) of plate 50. By loosening screws 70, the stop shoulder body 66 and stop shoulder 66' can be angularly adjusted to the desired location and fixed in that location by tightening of screws 70. The heads of screws 70 are oriented upwardly (see FIG. 3), these heads being inside the central space 32 of body 30, i.e., at the lower inner end of this central space. Access can be had to the adjustment screws by a screwdriver extending down through central space 32 of body 30.

Within central space 32 is received a removable, cylindrical, elongated, polymeric, preferably foam-type insulation plug 80 to add insulation for the underlying valve elements from the outside atmosphere. Plug 80 has an upper handle 80' for easy insertion and removal of the plug. At the upper end of central space 32 is a polymeric plug-type cap 82 (FIG. 3) which frictionally interfits with body 30 to retain insulation plug 80 in position and aid in closing off space 32 for insulative purposes. Even without the insert, the central space closed by cap 82 would provide thermal insulation, but the insert is thermally beneficial. A pair of recesses 38' in handle 38 adjacent cap 82 enable the cap to be readily pried out of position.

Around the outer periphery of body 30 is shown a polymeric, cylindrical, hollow sleeve 90 which has an inner diameter approximately that of the outer diameter of body 30. This sleeve 90 is bondable to surrounding insulation material when the actuator, valve and conduit containing the valve are enveloped in thermal insulation material. This insulation is shown roughly by the dash lines at 94 in FIG. 3. Body 30 can rotate within this sleeve 90.

An optional feature depicted in FIGS. 2 and 4 is the insertion and/or attachment into handle 38 of a pair of fluorescent elements 41 to enable a workman viewing the assembly in a dark place to quickly determine the angular position of the valve.

Second Embodiment

Figure 13:
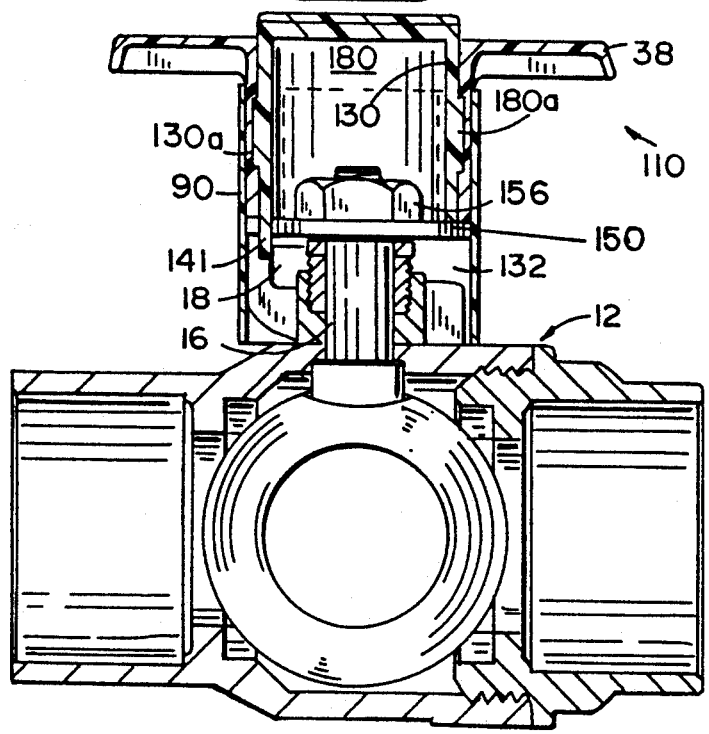
FIG. 13 is a sectional elevational view of the second embodiment in combination with a conventional valve.

Referring now specifically to FIGS. 11-14, the second embodiment is there shown to include the conventional valve 12 and the second embodiment of the valve actuator subassembly 110. This embodiment of the valve actuator subassembly is intended to be combined with valve 12 and specifically to have valve stem 16 protrude through a valve plate 150 to be in rotational relationship thereto, optionally being locked in position on valve plate 150 by lock nut 156. Plate 150 is preferably of metal, e.g., stainless steel. Valve stem 16 is preferably oblong, fitting within an oblong orifice in the center of valve plate 150 to lock these two components in rotational relationship with each other. The projection body 130 has an integral polymeric handle 38 like that of the first embodiment. Body 130 is also of a thermally nonconducting, polymeric material, cylindrical and hollow in configuration, to define a central space 132 therewithin (FIG. 13).

In this second embodiment, valve plate 150 does not need to have a memory stop mechanism thereon since the actuator itself serves this purpose, as will be described more fully hereinafter. The lower end of body 130 has drive lugs 140 (FIG. 11) which engage cooperative recesses 160 in plate 150 such that rotation of handle 38 and body 130 will cause rotation of plate 150 and thus of valve stem 16 of valve 12.

The outer end of the cylindrical plug includes an integral cap closing the end of the plug and of the central space. The plug may be filled with additional solid insulation or remain as an insulative air space.

The inner peripheral cylindrical wall of body 130, i.e., the outer wall of the space 132, has a plurality of axially elongated spline teeth, in effect forming a plurality of axial ribs and adjacent grooves 130a. These interfit with a similar set of spline teeth or ribs and grooves 180a on the outer cylindrical surface of polymeric plug 180 which can be inserted into, or axially removed from, space 132 of body 130. The lower end, i.e., inner end, of plug 180 has an integral, radially offset stop lug 141 (FIG. 11) axially projecting from body 180. Axial insertion of plug 180 down into interfitting relationship with body 130, i.e., by interfitting the spline teeth 180a and 130a, forms a rotary drive association between these two components. The lateral stop shoulder on lug 141 is designed to engage conventional fixed stop 18 on the valve body (FIG. 13). Therefore, by removing and rotating plug 180 to varying angular positions before insertion into body 130, the angular spacing between adjustable stop 141 and fixed stop 18 can be varied to preset and control the amount of angular valve opening to a preset value. Preferably, the cap portion of the plug 180 extends up above the surface of handle 38 for easy grasping for removal thereof. This can be assisted by insertion of a tool such as a screwdriver into recesses 180' to pop the plug out.

Both embodiments of this invention enable a valve as for an HVAC system to be thermally insulated from the outside atmosphere, thereby avoiding energy loss, condensation and corrosion which normally occur. Further, either version of the valve can employ an adjustable stop or memory stop mechanism to enable the open position of the valve to be constantly predetermined. Conceivably, the valve of the first embodiment could have a valve plate 50 which is not a memory stop plate and still have the insulative characteristics which uniquely result from this special construction. While this would not have all the advantages of the preferred structures depicted, it would have benefits over known devices.

These and several other objects, advantages and potential variances in minor details to suit a particular application will be apparent from study of the above specification by those skilled in the art. It is not intended that the invention should be limited specifically to those preferred embodiments shown and described as illustrative, but only by the scope of the appended claims and the reasonably equivalent structures to those defined therein.

I claim:

1. An extension actuator subassembly as for an HVAC valve comprising:

a rotational, polymeric, cylindrical, hollow projection body extending on a central axis, and having first and second ends;

a handle extending transversely to said axis on said first end of said projection body;

a valve plate at said second end of said projection body;

axially extending drive means on said second end of said projection body for engaging said valve plate to rotationally drive said valve plate and a valve stem engaging said valve plate;

attachment means on said second end of said projection body for attaching said valve plate onto said second end;

said hollow projection body defining a central space therein, open at said first and second ends of said projection body; and insulative means at said central space interfitting with said body for thermally insulating said central space and said valve plate against atmospheric condensation.

2. The actuator subassembly in claim 1 wherein said handle is polymeric and integral with said body, and said valve plate is metal.

3. The actuator assembly in claim 2 wherein said insulative means comprises a polymeric plug.

4. The extension actuator subassembly in claim 1 wherein:

said axially extending drive means comprises drive lugs on said second end of said projection body engaging said rotatable valve plate to rotationally drive said valve plate and a valve connected thereto;

said attachment means comprises axially extending, radially deflectable snap-on detents on said second end of said projection body for engaging and locking onto said valve plate; and said insulative means comprising a removable thermal insulation insert interfitting in said central space, and a cap interfitting with said body to cover said insert and close said central space.

5. A valve extension actuator subassembly for rotating an extending valve stem comprising:

a rotational, polymeric, cylindrical, hollow projection body extending on a central axis coaxial with the valve stem, having an open inner end and an open outer end, and defining a central space therein;

a handle on said outer end of said projection body;

a valve plate at said inner end of said projection body, rotatable therewith, and capable of receiving the extended valve stem to rotate it; and thermal insulative means at said central space for thermally insulating said subassembly against atmospheric condensation.

6. The actuator subassembly in claim 5 including axially extending drive lugs on said inner end of said projection body for engaging said valve plate to rotationally drive said valve plate, the valve stem and a valve element connected thereto.

7. The actuator subassembly in claim 5 including a cylindrical sleeve around said projection body for engaging surrounding insulation, yet allowing said projection body to be rotated therein.

8. The actuator subassembly in claim 5 including axially extending, radially deflectable, snap-on detents on said inner end of said projection body for engaging and locking onto said valve plate 9. The actuator subassembly in claim 5 including a removable thermal insulation insert in said central space to allow access as needed, and thermally insulate said valve plate when access is not needed.

10. A combination valve and extension actuator subassembly comprising:
a valve body having a rotatable valve element therein and a valve stem extending from said valve element through said valve body;
a rotational, polymeric, cylindrical projection body extending on a central axis coaxial with said valve stem and serving as a rotational driver;
a handle on one end of said projection body;
a valve plate at said second end of said projection body, rotatable therewith, and receiving said extended valve stem;
said projection body being free of metal components between said handle and said valve plate; and
drive means on said second end of said projection body for engaging said valve plate to rotationally drive said valve plate, said valve stem and said valve element.

11. The combination in claim 10 including:
axially extending, radially deflectable snap-on detents on said second end of said projection body for engaging and locking onto the valve plate;
a cylindrical sleeve around said projection body to allow said projection body to be rotated therein;
said projection body being hollow, defining a central space therein;
said central space extending through the ends of said body to allow access to said valve plate;
a removable thermal insulation insert in said central space; and
a cap closing said central space.

12. The combination in claim 10 wherein said valve plate is an adjustable memory stop plate.

13. The combination in claim 10 wherein said drive means comprises axially extending drive lugs on said body, in engagement with cooperative recesses in said valve plate.

14. The combination in claim 10 wherein said body is hollow and contains a removable polymeric plug interfitted therein.

15. The combination in claim 14 wherein said valve body has a stop thereon, and said plug has inner and outer ends and has a stop lug on said inner end for cooperation with said stop on said valve body.

16. An extension actuator subassembly as for an HVAC valve comprising:
a rotational, polymeric, cylindrical, hollow projection body extending on a central axis, and having first and second ends;
a polymeric handle extending transverse to said axis and integrally joined to said body on said first end of said body;
axially extending drive lugs on said second end of said projection body for engaging a rotatable valve plate to rotationally drive a valve engaged with the valve plate;
a valve plate attached to said second end;
axially extending, radially deflectable snap-on detents on said second end of said projection body for engaging and locking onto said valve plate;
a cylindrical sleeve around said body to allow said projection body to be rotated therein;
said hollow projection body defining a central space therein;
said central space extending through said first end of said body to allow access to said valve plate;
a removable thermal insulation insert in said central space; and
a removable cap closing said central space.

17. An extension actuator subassembly for an HVAC valve comprising:
a rotational, polymeric, cylindrical, hollow projection body extending on a central axis, and a handle extending transversely to said axis on one end of said body;
a rotatable valve plate at said second end of said projection body;
said valve plate having an adjustable memory stop to control the extent of opening of a valve which is actuated;
axially extending drive means on said second end of said projection body for engaging said rotatable valve plate to rotate said valve plate for rotationally driving a valve stem and valve connected thereto;
said hollow projection body defining a central space therein;
said central space extending through said body to allow access to said adjustable stop of said valve plate; and
a removable thermal insulation insert in said central space to allow said access as needed, and to thermally insulate said valve plate when said access is not needed.

18. The extension actuator subassembly in claim 17 wherein said adjustable memory stop comprises a stop lug body having a stop lug thereon, having an arcuate slot and screws extending through said slot and into said valve plate to secure said stop lug body and said stop lug in a fixed angular position, but allow said stop lug body and stop lug to be moved to a different angular position upon loosening of said screws.

19. An extension actuator subassembly as for an HVAC valve comprising:
a rotational, polymeric, cylindrical, hollow projection body extending on a central axis, and having inner and outer ends;
a handle on said outer end of said projection body;
a valve plate at said inner end of said projection body and rotatable with said body on said axis;
said hollow projection body having a wall defining a central cylindrical space therein;
said body wall having axial spline teeth;
a cylindrical plug insertable into and removable from said central space, and having spline teeth on the outer surface thereof engageable with said spline teeth on said body when inserted;
said plug having an outer end and an inner end;
a radially offset, protruding stop lug at said plug inner end for engaging a stop element on a valve, whereby with removal of said plug, rotation thereof, and reinsertion thereof into said central space of said body, the angular location of said stop lug can be varied to preset the amount of rotation of said body and thereby preset a controlled amount of opening of the valve.

20. The extension actuator subassembly in claim 19 wherein said stop lug is integral with said plug, and said outer end of said plug forms an integral closure for said plug and includes surface means for assisting removal of said plug from said body.

21. An extension actuator subassembly as for HVAC valve comprising:
 a rotational, polymeric, cylindrical, hollow projection body extending on a central axis, and having first and second ends;
 an integral polymeric handle extending transversely to said axis on said first end of said projection body;
 a valve plate at said second end of said projection body;
 said hollow projection body and said handle defining a central space therein with said valve plate exposed to said central space;
 axially extending drive means on said second end of said projection body for rotationally driving said valve plate;
 thermal insulative means at said central space; and
 a removable cap over said central space sealing said central space against formation of atmospheric condensation.

* * * * *